UNITED STATES PATENT OFFICE.

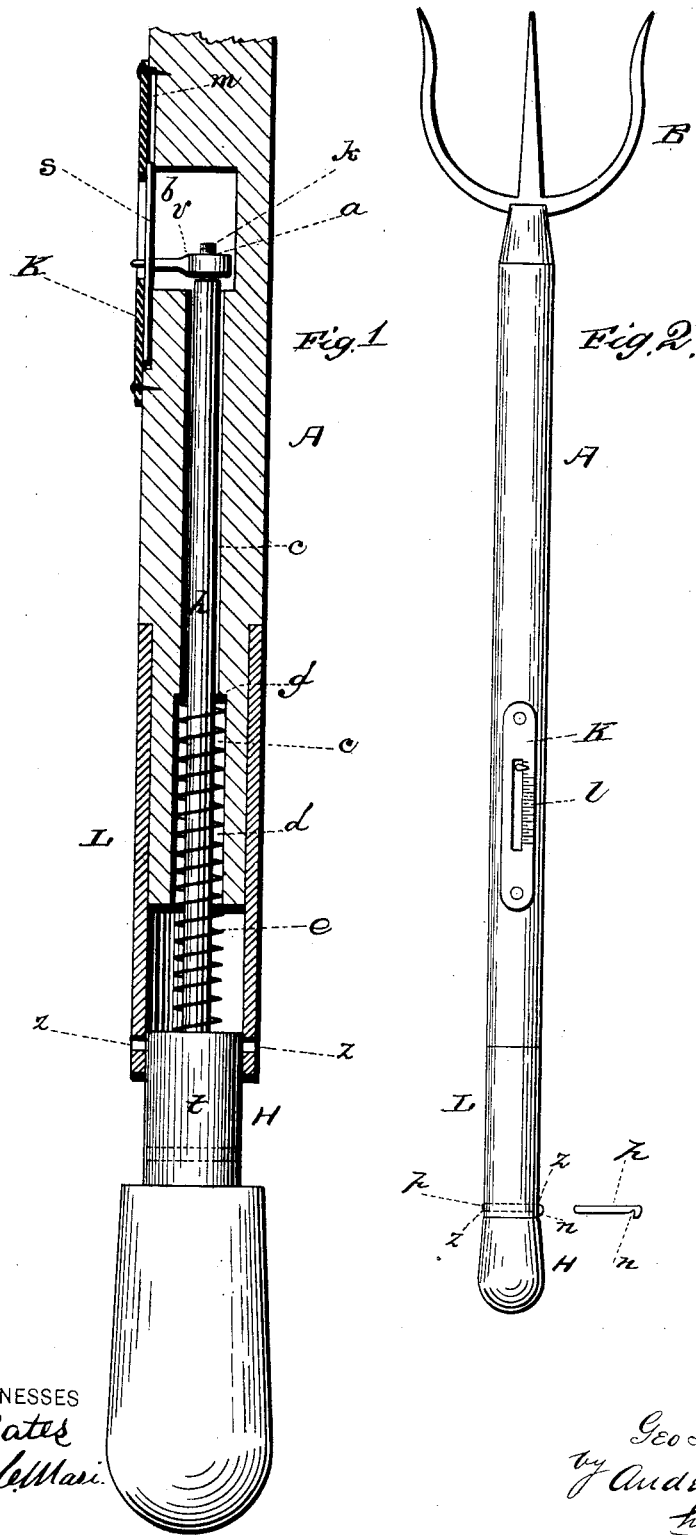

GEORGE A. STEWART, OF WELLS' TANNERY, PENNSYLVANIA.

FORK FOR WEIGHING HAY.

SPECIFICATION forming part of Letters Patent No. 268,747, dated December 5, 1882.

Application filed March 25, 1882. (No model.)

*To all whom it may concern:*

Be it known that I, GEORGE A. STEWART, a citizen of the United States, and a resident of Wells' Tannery, in the county of Fulton and State of Pennsylvania, have invented a new and valuable Improvement in Weighing Hay-Forks; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a vertical sectional view of my improved fork, and Fig. 2 is a side view of the same.

This invention has relation to weighing-forks for hay and straw; and it consists in the construction and novel arrangement of the knob-section of the handle, its screw-rod and regulator, connected to the movable index, the spring, the ferrule, and the transverse pin holding the knob-section of the handle in locked position when the weighing devices are not in use, all as hereinafter set forth, and particularly pointed out in the claims appended.

In the accompanying drawings, the letter A designates the main part or body of the handle, which is attached to the fork B. The end of this part A of the handle is bored centrally, as indicated at $c$, the bore being larger at its outer part and serving to form a seat, $d$, for the operating-spring $e$, the ends of which bear against a shoulder, $g$, in the bore and against the end of the knob-section H.

K represents a slotted register-plate, which is duly graduated with a weight-scale, as indicated at $l$. Under this plate is a slideway, $m$, in which is located the movable index-slide $s$, which is provided with a lug, $v$, having a threaded aperture, $a$, said lug being designed to extend through a slot, $b$, into the bore $c$ of the handle.

L represents a ferrule, which surrounds the end of the main section A of the handle, and extends beyond the end thereof to receive the stem $t$ of the knob-section H. To the knob-section is firmly secured the end of a rod, $h$, which, passing through the spring $e$, extends into the bore $c$ of the handle. The end $k$ of this rod $h$ is threaded to engage the threaded hole in the lug $v$ of the index-slide $s$.

In operating the weighing devices the fork is thrust into the hay, and then raised perpendicularly and rested on the knob-section. In this position the weight on the fork will depress the main handle-section A until the spring $e$, which supports it from the knob-section, is equalized, the index-slide then pointing out the weight on the scale. Should the spring be weakened or inaccurate in its relation to the index and its bearing on the shoulder of the knob-section, the relative position of the index can be properly adjusted by turning the connecting-rod $h$ in the lug $v$.

When the weighing devices are not in use the knob-section is designed to be secured to the coupling ferrule by means of a transverse pin, $p$, having notches $u$, and extending through perforations $z$ in the ferrule and knob-section.

Having described this invention, what I claim, and desire to secure by Letters Patent, is—

1. In a weighing-fork for hay and straw, the knob-section H, having a rigidly-secured screw-rod, $h$, extending into the bore of the handle and engaging the threaded aperture $a$ of the lug $v$ of the index-slide, substantially as specified.

2. A weighing-fork for hay and straw, having the bore $c$, internal shoulder, $g$, slideway $m$, and scale-plate K, the spring $e$, index-slide $s$, and its lug $v$, having the threaded aperture $a$, the coupling-ferrule L, knob-section H, and threaded connecting-rod and regulator $h$, engaging the lug $v$, substantially as specified.

In testimony that I claim the above I have hereunto subscribed my name in the presence of two witnesses.

GEO. A. STEWART.

Witnesses:
JOHN B. ALEXANDER,
GEORGE STEWART.